This invention relates to a novel method and apparatus for controlling the output of spark-ignition internal-combustion engines whereby the part-load fuel economy of the engine is significantly increased. In a specific aspect, the invention relates to a method and apparatus whereby the maximum power output of the engine under conditions of high-load may also be increased.

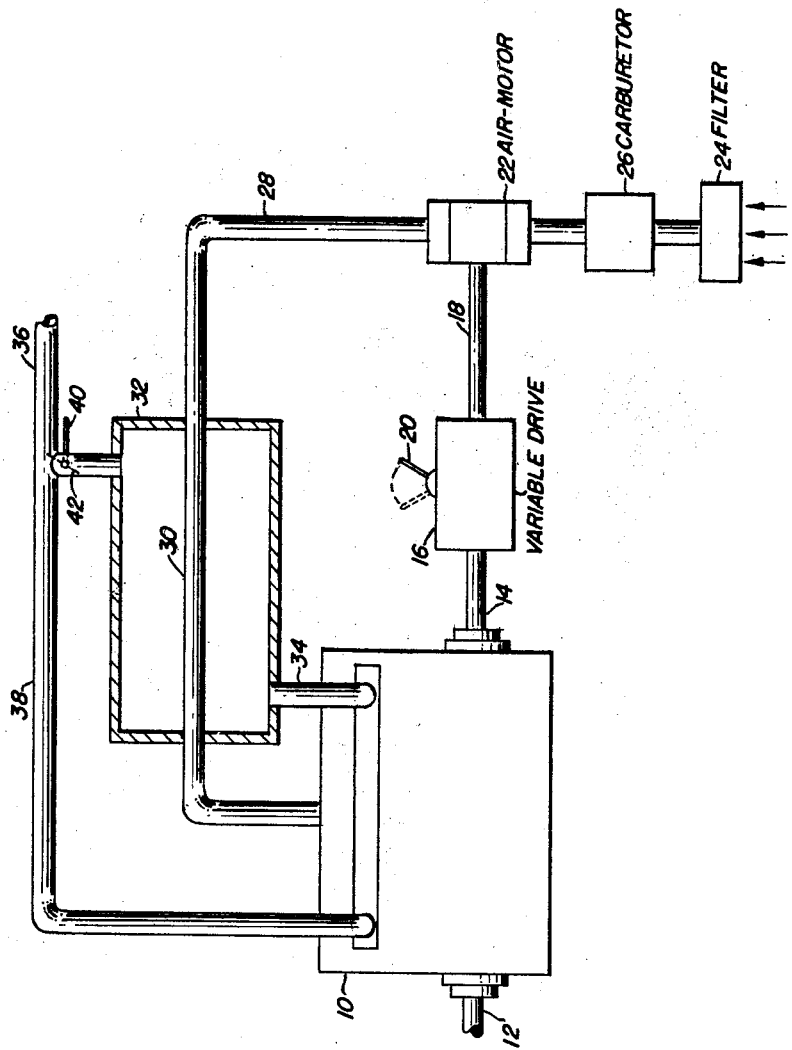
INVENTOR.
JOHN H. FREEMAN, JR.
BY
ATTORNEY 3,180,079
APPARATUS FOR OPERATING SPARK-IGNITION INTERNAL COMBUSTION ENGINES
John H. Freeman, Jr., Crystal Lake, Ill., assignor to The Pure Oil Company, Chicago, Ill., a corporation of Ohio
Filed Aug. 9, 1961, Ser. No. 130,407
1 Claim. (Cl. 60—14)

Almost all spark-ignition internal-combustion engines are rendered flexible in operation by means of throttling the incoming air, or air-fuel mixture, to the engine. This throttling is accomplished by passing the charge of air and fuel through a valve (throttle plate) so that the mixture is expanded without doing mechanical work upon or obtaining useful work from the flowing mixture. Thus, the condition of the mixture in the intake manifold, after throttling, is such that the pressure and density of the mixture is greatly reduced, while the temperature remains substantially unchanged.

It is an object of this invention to provide an improved method for the operation of spark-ignition internal-combustion engines whereby improved economies may be obtained under low-load operating conditions.

Another object of this invention is to provide a novel apparatus for controlling the power output of internal-combustion engines, whereby increased engine efficiency may be obtained.

Yet another object of this invention is to provide an assembly for controlling the power output of a spark-ignition internal-combustion engine whereby the maximum power output of the engine is increased.

These and other objects of the invention will become apparent from the following detailed description.

Briefly, in accordance with the method of this invention, the power output of an internal-combustion engine is controlled by flowing the intake air through an air motor such that the air is expanded under substantially adiabatic conditions, whereby useful mechanical energy is derived from the expanding air. This energy is fed to the crankshaft of the engine. The engine manifold pressure, and power output, is regulated by adjusting the speed ratio between the air motor and the crankshaft.

The drawing illustrates the basic layout of one embodiment of the invention in diagrammatic form.

The invention is best described with reference to the drawing, wherein the numeral 10 designates a conventional six-cylinder, spark-ignition, internal-combustion engine having a power output shaft 12 and a secondary-output shaft 14 which is connected to a variable-speed drive 16. The ratio between the shafts 14 and 18, that is, the ratio of input to output speeds of the variable drive 16 is controlled by the position of engine-control rod 20. In the control of engine output power, the positioning of rod 20 operates in a manner analogous to the positioning of the throttle lever in conventional engine operation, as will hereinafter become apparent. Any of the numerous belt-drive or cone drive variable speed devices, which are well known in the art, may be employed in the apparatus of this invention. However, it is preferred that a variable-speed drive, such as disclosed by Oehrli, in U.S. Patent No. 2,835,238, be employed. The ratio of engine-shaft speed to the output-drive-shaft 18 speed will be substantially higher, however, than when such device is employed for supercharging an engine.

Air-motor 22, which drives shaft 18 and thus the crankshaft of engine 10, is preferably adapted so that it may be used either as an air-motor or as a supercharger, depending upon the speed ratio provided between the shafts 18 and 14. Thus positive-displacement devices such as the Roots, vane, Lysholm, or Bicera types may be used.

Air entering the system through air cleaner 24 flows then to carburetor 26, wherein a suitable proportion of fuel is mixed with the air. The air-fuel mixture then flows to air-motor 22, then through line 28 to tube 30 of heat exchanger 32, and thence to the engine intake-manifold. Some of the exhaust from the engine passes through line 34 to the shell of heat exchanger 32, and thence to the main exhaust line 36. Another portion of the exhaust flows through bypass line 38 to main exhaust line 36. The proportion of engine exhaust flowing through the heat exchanger 32 may be varied by movement of arm 40 which connects to butterfly valve 42.

It will be evident that the ratios of the speeds of the engine crankshaft and of air-motor 22 is determined by variable-speed drive 16. It is further evident that, in the absence of throttling, the air-flow rate through the engine is proportional to engine speed, and the air-flow rate through the air-motor is proportional to the speed of the air motor. Accordingly, the ratio of speeds of the engine crankshaft and of the air motor may be adjusted to produce any desired engine manifold pressure. When the ratio of engine speed to air-motor speed is low, the manifold pressure will be high. As the ratio of engine speed to air-motor speed increases, the manifold pressure will drop. It is evident that there will be one ratio of engine speed to air-motor speed, depending upon the displacement of the engine and the capacity of the air-motor, at which the manifold pressure will be approximately atmospheric pressure. At this ratio, the air-motor will idle, that is, the air-motor will have no work done upon it by the air, and thus will transmit no torque to the engine crankshaft. Neither will the air-motor do any work upon the air, nor receive any torque from the engine crankshaft. Air flow through the air-motor will be substantially at constant pressure and without expansion. Operation of the engine under such conditions is equivalent to wide-open throttle operation of a conventionally carbureted internal-combustion engine. As the ratio of engine speed to air-motor speed is increased, the air volume handled by the engine exceeds the intake-air volume, to the air-motor, and consequently expansion occurs in the air-motor and a pressure drop is developed across the air-motor. Since the expansion in an air-motor is substantially adiabatic, the temperature of the air, as well as the pressure, will decrease substantially, and mechanical energy produced by the air-motor will be transmitted through the variable-speed drive to the engine crankshaft. It will be evident that where the ratio provided by variable-speed drive 16 is altered to decrease the ratio of engine speed to air-motor speed below that at which the air-motor idles, the air-motor, if of a type capable of acting as a compressor, will serve as a supercharger for the engine and increase the engine manifold pressure above atmospheric pressure. A Roots blower is an example of a device capable of use either as a compressor or as an air-motor, depending upon the speed of operation and the air-flow rate. Thus, depending upon the positioning of control arm 20, engine 10 will be throttled or supercharged.

During part-load operation, spark-ignition internal-combustion engines customarily operate at pressure ratios of about 2.5 or less, that is, at manifold vacuums not in excess of about 18 inches of mercury. At intermediate loads, the manifold vacuum will decrease from 18 inches of mercury as the manifold pressure approaches atmospheric pressure. The low-load condition of about 18 inches of mercury manifold vacuum therefore is the limiting condition at which the maximum work output of the air-motor will be obtained, and the maximum pressure and temperature drop will occur across the air-motor. Under such conditions of operation, the pressure drop across the air-motor will be about 18 inches of mercury, the temperature drop will be about 118° F., and the power output of the air-motor will be about 34 B.t.u. per pound of air, less friction losses. In conventional engine operation, this will amount to an increase of about 6% in over-all engine efficiency, a lesser increase in engine efficiency being obtained as engine load increases and the engine manifold pressure approaches atmospheric pressure.

Under normal conditions of operation, using conventional fuels, serious carburetion problems will be expected to result from a temperature drop of 118° F., from atmospheric air temperature. In order to overcome these difficulties, heat exchanger 32 is provided to warm the expanded mixture from the cooled condition at which it leaves airmotor 22 to a temperature approaching atmospheric temperature. This heat is most conveniently obtained from the exhaust gases, which flow through the shell of heat exchanger 32. As is well known in the art, exhaust-gas temperatures range between about 1000° F. and about 1400° F., depending upon engine design, the air-fuel mixture employed, and other factors. Engine-exhaust temperature is, however, substantially independent of manifold pressure. Since a mean temperature differential between the cool, expanded, intake air and the exhaust will always exceed about 900° F., it is evident that a simple, small heat exchanger will suffice to warm the air to a temperature compatible with the fuel employed. The single tube-and-shell heat exchanger shown is merely one example of heat-exchanger means which may be employed. In many instances, a common wall between the intake manifold and exhaust manifold will be sufficient to provide adequate heat exchange. Since the flow rates of the hot and cold mediums through the heat exchanger are always proportional, and change proportionally depending upon engine speed, it is evident that there will always be sufficient exhaust gas to provide heat for the incoming air. It will be further apparent that as manifold pressure increases, the flow rates through the heat exchanger, in pounds per unit time, will increase, and the temperature by which the intake air is to be heated will be decreased, since the temperature drop across the air-motor will decrease. Thus the heat-transfer duty of the heat exchanger will not change appreciably, and it will not ordinarily be necessary to alter heat-exchanger operations to compensate for changes in engine load. Simple means, such as control lever 40 and butterfly valve 42, together with exhaust bypass 38, will preferably be provided to permit complete bypassing of the heat exchanger when the engine is operating at full load, or when the engine is supercharged.

As a specific example of the application of this invention, a GMC 401 V-6 engine is equipped with a Roots-type blower and a heat exchanger connected between the carburetor and intake manifold. The output of the Roots blower is connected through a variable, V-belt drive system to the fan-belt pulley of the engine. The heat exchanger is of the shell-and-tube type (3½ inch shell, 2 inch tube), and has an effective heat-transfer area of 6.5 sq. ft. and a heat duty of 43,400 B.t.u./hr. The Roots blower has a displacement of 233 cu. in., with 6.48 in. rotors (rotor length equals the rotor diameter). The variable V-belt drive is capable of producing crankshaft-to-blower speed ratios in the range of 1.9:1 to .927:1. The variable-speed drive is set to an initial ratio of 1.9:1, the engine is started, and after warm-up the specific fuel consumption of the engine is determined at various loads, engine speed being maintained constant throughout the test at 3200 r.p.m. The specific fuel consumption of the engine, at various loads, is set out in the following table, in comparison with the specific fuel consumption of the engine at the same speed and loads when operated by conventional carburetion and throttling.

TABLE I

*Specific fuel consumption*

| Brake Horsepower | Lbs. of Fuel Per B.H.P.-Hour | |
|---|---|---|
| | Conventional Throttling | Air-Motor Controlled |
| 40 | .847 | .820 |
| 60 | .740 | .697 |
| 80 | .602 | .596 |
| 100 | .556 | .542 |

It is evident that a substantial improvement in fuel economy is obtained under part-load conditions. The variable-speed drive mechanism is then adjusted to produce the lowest ratio of engine speed to blower speed, and the engine manifold pressure is measured and determined to be in excess of atmospheric pressure. During the period of supercharged operation, the flow of exhaust through the heat exchanger is discontinued by disconnecting the heat exchanger from the engine exhaust manifold.

While the invention has been described with reference to an embodiment in which a conventional carburetor is employed, the invention is also applicable to systems in which fuel is injected either into the cylinder or into the air before induction into the cylinder. The use of fuel injection enhances the advantages which accrue from this invention in several ways. For example, the carburetion difficulties which might otherwise result from cooling of the intake air will not exist when fuel injection is used in place of conventional carburetion. Thus, the use of a heat exchanger is unnecessary, and for equivalent-mass air flows, the air-motor can be operated at a substantially greater pressure ratio than for the case where heat is added to the intake air after expansion. This results in a correspondingly greater output from the air-motor without impairing the thermal efficiency of the engine.

The embodiments of the invention in which an exclusive property or privilege is claimed are defined as follows:

In a method for operating a spark-ignition internal combustion engine equipped with an air-motor connected by a variable speed drive to the power output shaft of said engine, the steps of expanding air passing through said air-motor, from substantially atmospheric pressure to a predetermined sub-atmospheric intake-manifold pressure during part-load operation of said engine and transmitting the mechanical power produced by the air-motor to the power output shaft of said engine, and during high-load operation of said engine changing the speed ratio between said shaft and said air-motor so as to cause said motor to compress air and supercharge the engine.

References Cited by the Examiner

UNITED STATES PATENTS

| 1,254,358 | 1/18 | Rinehart | 103—118 |
| 1,642,137 | 9/27 | Banner | 60—31 |
| 1,916,952 | 7/33 | Heitger | 123—122 |
| 2,080,079 | 5/37 | Johnson | 123—119 X |
| 2,091,356 | 8/37 | Fawcett | 123—119 |
| 2,622,390 | 12/52 | Newton | 60—13 |
| 2,784,549 | 3/57 | Henney | 60—31 |

FOREIGN PATENTS 601,965  11/24  France.

JULIUS E. WEST, *Primary Examiner.*

KARL J. ALBRECHT, *Examiner.*